(12) United States Patent
Chaudhry et al.

(10) Patent No.: US 10,461,529 B2
(45) Date of Patent: Oct. 29, 2019

(54) TRIGGER CIRCUITRY FOR ELECTROSTATIC DISCHARGE (ESD) PROTECTION

(71) Applicant: RF Micro Devices, Inc., Greensboro, NC (US)

(72) Inventors: Muhammad Iqbal Chaudhry, Greensboro, NC (US); Nathaniel Peachey, Oak Ridge, NC (US)

(73) Assignee: Qorvo US, Inc., Greensboro, NC (US)

( * ) Notice: Subject to any disclaimer, the term of this patent is extended or adjusted under 35 U.S.C. 154(b) by 588 days.

(21) Appl. No.: 15/079,554

(22) Filed: Mar. 24, 2016

(65) Prior Publication Data

US 2016/0352098 A1 Dec. 1, 2016

Related U.S. Application Data

(60) Provisional application No. 62/168,340, filed on May 29, 2015.

(51) Int. Cl.
*H02H 9/04* (2006.01)

(52) U.S. Cl.
CPC .................................. *H02H 9/046* (2013.01)

(58) Field of Classification Search
CPC ................................. H02H 9/04; H02H 9/041
USPC .......................................................... 361/56
See application file for complete search history.

(56) References Cited

U.S. PATENT DOCUMENTS

| 6,917,207 B1 | 7/2005 | Blumenthal |
| 7,453,676 B2 | 11/2008 | Huh |
| 7,929,263 B1 | 4/2011 | Peachey et al. |
| 7,969,699 B2 * | 6/2011 | Fan ........................ H02H 9/046 361/56 |
| 2009/0195951 A1 * | 8/2009 | Sorgeloos .............. H02H 9/046 361/56 |
| 2015/0325568 A1 | 11/2015 | Chaudhry et al. |
| 2016/0172850 A1 * | 6/2016 | Ellis-Monaghan .... H02H 9/046 361/56 |

(Continued)

OTHER PUBLICATIONS

Non-Final Office Action for U.S. Appl. No. 14/687,310, dated Aug. 9, 2017, 5 pages.

(Continued)

*Primary Examiner* — Dharti H Patel
(74) *Attorney, Agent, or Firm* — Withrow & Terranova, P.L.L.C.

(57) ABSTRACT

Aspects disclosed herein include trigger circuitry for electrostatic discharge (ESD) protection. In this regard, in one aspect, an ESD protection circuit is provided to protect an integrated circuit (IC) from an ESD event. Trigger circuitry, which includes a voltage divider for example, divides a voltage spike between a supply rail and a ground rail to provide a trigger voltage. An ESD clamping circuitry is activated to discharge the voltage spike when the trigger voltage is determined to exceed an ESD threshold voltage, thus protecting the IC from being damaged by the voltage spike. By activating the ESD clamping circuitry based on the trigger voltage divided from the voltage spike, it is possible to adapt the ESD protection circuit to provide ESD protection based on different ESD threshold voltages, thus making it possible to deploy the ESD protection circuit on ICs having different ESD protection requirements.

19 Claims, 9 Drawing Sheets

(56) References Cited

U.S. PATENT DOCUMENTS

2016/0285255 A1* 9/2016 O'Donnell ............... H02H 9/02

OTHER PUBLICATIONS

Mergens, M.P.J. et al., "Diode-Triggered SCR (DTSCR) for RF-ESD Protection of BiCMOS SiGe HBTs and CMOS Ultra-Thin Gate Oxides," IEEE International Electron Devices Meeting, 2003, IEDM '03 Technical Digest, Dec. 8-10, 2003, pp. 21.3.1-21.3.4.
Voldman, S.H. et al., "Silicon Germanium Heterojunction Bipolar Transistor ESD Power Clamps and the Johnson Limit" Electrical Overstress/Electrostatic Discharge Symposium, 2001, EOS/ESD '01, pp. 324-334.

* cited by examiner

TRIGGER CIRCUITRY FOR ELECTROSTATIC DISCHARGE (ESD) PROTECTION

RELATED APPLICATIONS

This application claims the benefit of U.S. Provisional Patent Application Ser. No. 62/168,340, filed May 29, 2015, the disclosure of which is incorporated herein by reference in its entirety.

This application is related to U.S. patent application Ser. No. 14/687,310, filed Apr. 15, 2015, entitled "ELECTROSTATIC DISCHARGE (ESD) PROTECTION CIRCUIT," now published as U.S. Patent Application Publication Number 2015/0325568 A1, which claims priority to U.S. Provisional Patent Application Ser. No. 61/991,128, filed May 9, 2014, the disclosure of which is incorporated herein by reference in its entirety.

FIELD OF THE DISCLOSURE

The technology of the disclosure relates generally to protecting integrated circuits (ICs) during fabrication and production.

BACKGROUND

Mobile communication devices have become increasingly common in current society. The prevalence of these mobile communication devices is driven in part by the many functions that are now enabled on such devices. Demand for such functions increases the processing capability requirements for the mobile communication devices. As a result, increasingly complex integrated circuits (ICs) have been designed and manufactured to provide increasingly greater functionality in the mobile communication devices. Concurrent with the increase in complexity of the ICs, there has been pressure to decrease the footprint of the ICs as well.

It has become more challenging to increase yields and improve quality of the ICs during fabrication and production processes. As such, there is a growing interest in the effect of electrostatic discharge (ESD) during fabrication of the ICs, assembly of devices that use the ICs, and the operation of the ICs. ESD can be seen as a miniature lightning bolt of static charge between two surfaces that have different electrical potentials. Without proper protection, static charge movement associated with ESD may generate an electrical current high enough to damage or even destroy the passive and active devices, such as diodes and transistors, thus, rendering the ICs dysfunctional.

SUMMARY

Aspects disclosed herein include trigger circuitry for electrostatic discharge (ESD) protection. In this regard, in one aspect, an ESD protection circuit is provided to protect an integrated circuit (IC) from an ESD event. Trigger circuitry, which includes a voltage divider for example, divides a voltage spike between a supply rail and a ground rail to provide a trigger voltage. An ESD clamping circuitry is activated to discharge the voltage spike when the trigger voltage is determined to exceed an ESD threshold voltage, thus protecting the IC from being damaged by the voltage spike. By activating the ESD clamping circuitry based on the trigger voltage divided from the voltage spike, it is possible to adapt the ESD protection circuit to provide ESD protection based on different ESD threshold voltages, thus making it possible to deploy the ESD protection circuit on ICs having different ESD protection requirements.

In another aspect, an ESD protection circuit in an IC is provided. The ESD protection circuit comprises ESD clamping circuitry coupled between a supply rail and a ground rail and configured to discharge an ESD event in an IC in response to an activation signal. The ESD protection circuit also comprises trigger circuitry configured to divide a voltage spike between the supply rail and the ground rail to provide a trigger voltage. The ESD protection circuit also comprises latch circuitry coupled to the ESD clamping circuitry and the trigger circuitry. The latch circuitry is configured to detect that the trigger voltage exceeds an ESD threshold voltage. The latch circuitry is also configured to provide the activation signal in response to detecting the trigger voltage exceeding the ESD threshold voltage.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed herein include trigger circuitry for electrostatic discharge (ESD) protection. In this regard, in one aspect, an ESD protection circuit is provided to protect an integrated circuit (IC) from an ESD event. Trigger circuitry, which includes a voltage divider for example, divides a voltage spike between a supply rail and a ground rail to provide a trigger voltage. An ESD clamping circuitry is activated to discharge the voltage spike when the trigger voltage is determined to exceed an ESD threshold voltage, thus protecting the IC from being damaged by the voltage spike. By activating the ESD clamping circuitry based on the trigger voltage divided from the voltage spike, it is possible to adapt the ESD protection circuit to provide ESD protection based on different ESD threshold voltages, thus making it possible to deploy the ESD protection circuit on ICs having different ESD protection requirements.

Figure 1:
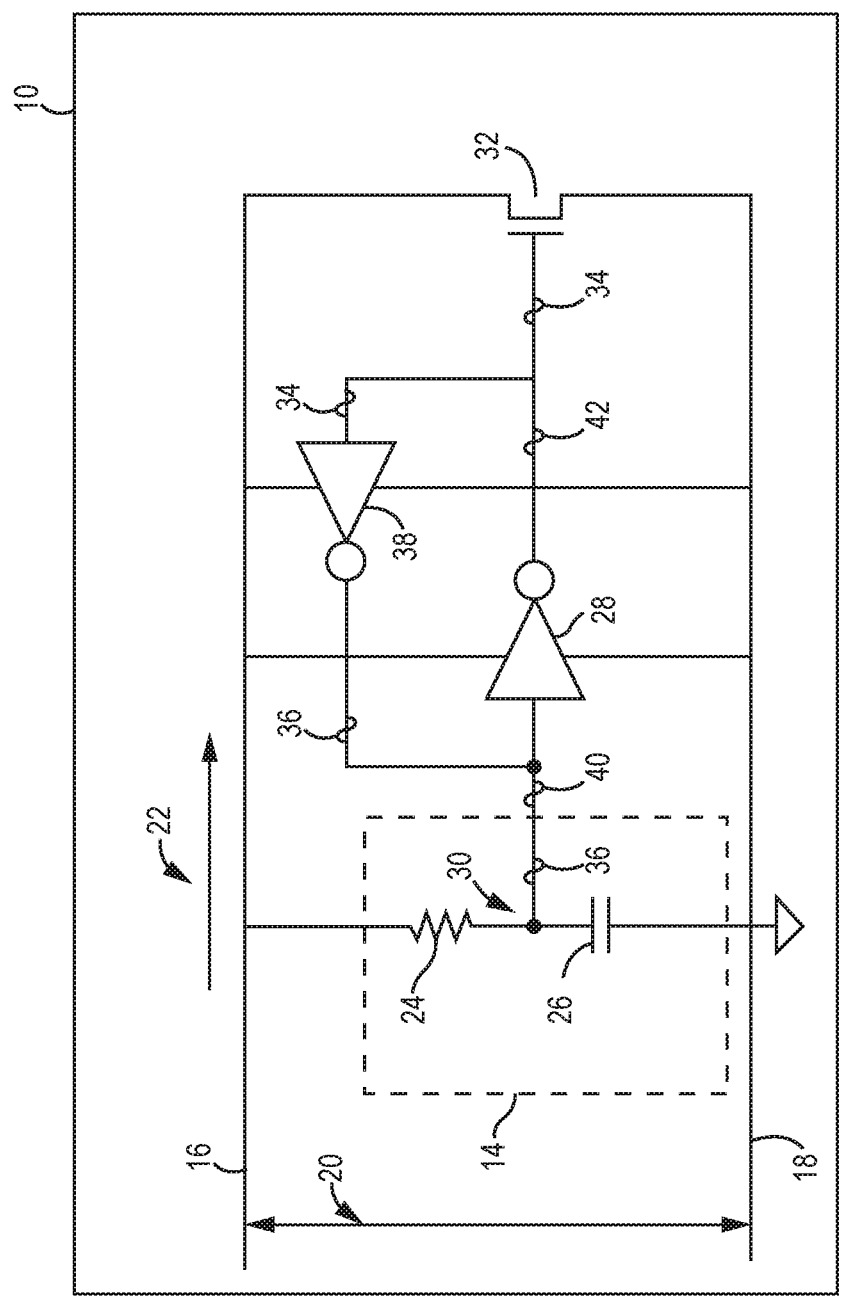
FIG. 1 is a schematic diagram of an exemplary conventional electrostatic discharge (ESD) detection circuit configured to detect an ESD event in an integrated circuit (IC) based on rising times of a voltage spike between a supply rail and a ground rail in the IC.

Before discussing the ESD protection concepts of the present disclosure, a brief overview of a conventional approach for detecting an ESD event in an electronic circuit that may benefit from exemplary aspects of the present disclosure is provided with reference to FIG. 1. The discussion of specific exemplary aspects of an ESD protection circuit starts below with reference to FIG. 2.

In this regard, FIG. 1 is a schematic diagram of an exemplary conventional ESD detection circuit 10 configured to detect an ESD event in an IC 12 using a resistor-capacitor (RC) circuit 14 coupled between a supply rail 16 and a ground rail 18. With reference to FIG. 1, insulator surfaces (not shown) may be rubbing together or pulling apart during fabrication and production of the IC 12. As a result, one surface may be gaining electrons, while another surface loses the electrons, thus creating an unbalanced electrical condition known as static charge. An ESD event occurs when a voltage spike 20 between the supply rail 16 and the ground rail 18 is high enough to break down dielectric strength of the medium between the two surfaces. As a result, the static charge moves from one surface to another due to sufficiently high voltage differential between the two surfaces. When the static charge moves, it becomes an electrical current 22 that can damage or even destroy the IC 12. In this regard, the IC 12 must be protected from the voltage spike 20 during fabrication and production.

With continuing reference to FIG. 1, the RC circuit 14 includes a resistor 24 and a capacitor 26 disposed in a serial arrangement between the supply rail 16 and the ground rail 18. The RC circuit 14 is coupled to a first inverter 28 at a coupling point 30 disposed between the resistor 24 and the capacitor 26. The first inverter 28 is coupled to a clamp device 32. The clamp device 32 is configured to discharge the electrical current 22 caused by the voltage spike 20 in response to receiving a logical high signal 34.

When the voltage spike 20 occurs between the supply rail 16 and the ground rail 18, the capacitor 26 cannot be charged to the voltage level of the voltage spike 20 instantaneously. As a result, the RC circuit 14 provides a logical low signal 36 to the first inverter 28. Consequently, the first inverter 28 inverts the logical low signal 36 into the logical high signal 34 to activate the clamp device 32 to discharge the electrical current 22. The logical high signal 34 is also received by a second inverter 38, which is configured to invert the logical high signal 34 back to the logical low signal 36. The second inverter 38 provides the logical low signal 36 to the first inverter 28, thus keeping the clamp device 32 activated for a prolonged period. When the capacitor 26 is fully charged, the RC circuit 14 provides a logical high signal 40 from the coupling point 30 to the first inverter 28. The first inverter 28 inverts the logical high signal 40 into a logical low signal 42 to deactivate the clamp device 32.

The conventional ESD detection circuit 10 has two obvious drawbacks. First, if the rise time of the voltage spike 20 is slower than the duration needed by the capacitor 26 to charge up to the voltage spike 20, the clamp device 32 will not be activated in time to protect the IC 12. Second, if the rise time of a normal operation voltage (e.g., $V_{DD}$) for the IC 12 happens to be faster than the duration needed by the capacitor 26 to charge up to the voltage spike 20, the clamp device 32 can be falsely activated. Therefore, it is unreliable to activate the clamp device 32 based on the rise time of the voltage spike 20. In addition, some ICs may be more vulnerable or tolerant to the voltage spike 20 than other ICs. In this regard, it may be desirable to adapt ESD protection to different voltage levels of the voltage spike 20.

Figure 2:
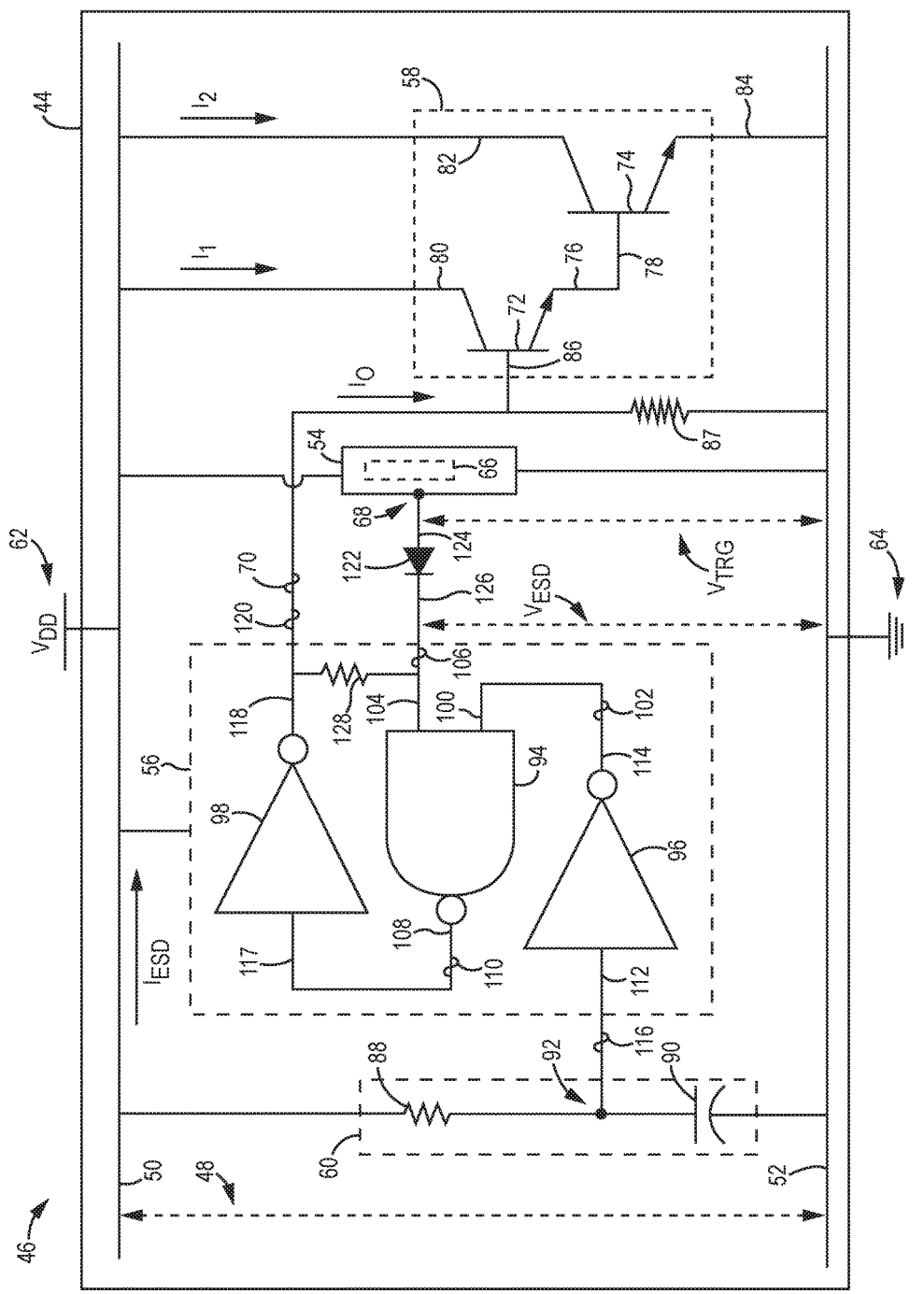
FIG. 2 is a schematic diagram of an exemplary ESD protection circuit configured to detect and discharge an ESD event in an IC when a trigger voltage ($V_{TRG}$) divided from a voltage spike between a supply rail and a ground rail exceeds an ESD threshold voltage ($V_{ESD}$)

In this regard, FIG. 2 is a schematic diagram of an exemplary ESD protection circuit 44 configured to detect and discharge an ESD event in an IC 46 when a trigger voltage ($V_{TRG}$) divided from a voltage spike 48 between a supply rail 50 and a ground rail 52 exceeds an ESD threshold voltage ($V_{ESD}$). In a non-limiting example, the ESD protection circuit 44 is configured to protect the IC 46 from being damaged by the voltage spike 48 during fabrication and production. The ESD protection circuit 44 includes trigger circuitry 54, latch circuitry 56, ESD clamping circuitry 58, and delay circuitry 60. The supply rail 50 and the ground rail 52 are coupled to a voltage source 62 and a ground 64, respectively. In a non-limiting example, the voltage source 62 is coupled to a $V_{DD}$ voltage.

With continuing reference to FIG. 2, the trigger circuitry 54 is coupled between the supply rail 50 and ground rail 52. In a non-limiting example, the trigger circuitry 54 includes a voltage divider 66 configured to divide the voltage spike 48 to provide the trigger voltage ($V_{TRG}$) between an output point 68 of the trigger circuitry 54 and the ground rail 52. In this regard, the trigger voltage ($V_{TRG}$) is less than the voltage spike 48. The ESD event is detected if the trigger voltage ($V_{TRG}$) exceeds the ESD threshold voltage ($V_{TRG}$>$V_{ESD}$). Thus, by using the voltage divider 66 to provide the trigger voltage ($V_{TRG}$) that is proportional to the voltage spike 48, the ESD protection circuit 44 can be flexibly configured to provide proper ESD protection to the IC 46. For example, if the voltage spike 48 during the ESD event is typically six point nine volts (6.9 V) and the IC 46 can only tolerate up to six point five volts (6.5 V) of voltage spike, then the trigger circuitry 54 can be configured to provide the trigger voltage ($V_{TRG}$) at or below 6.5 V ($T_{TRG}$≤6.5 V) to protect the IC 46 from being damaged by the voltage spike 48. If, however, the trigger circuitry 54 is provided in another IC that can only tolerate up to six volts (6 V) of the voltage spike, the trigger circuitry 54 can be reconfigured to provide the trigger voltage ($V_{TRG}$) at or below 6 V ($T_{TRG} \leq 6$ V) to protect that IC from ESD damage. In this regard, it is not necessary to redesign the ESD protection circuit 44 for ICs having different ESD tolerances, thus helping to reduce design complexity and implementation costs.

The latch circuitry 56 provides an activation signal 70, which is logical high, for example, to activate the ESD clamping circuitry 58 to discharge the ESD event in the IC 46. In a non-limiting example, the ESD threshold voltage ($V_{ESD}$) is configured to be higher than the $V_{DD}$ voltage to prevent the ESD clamping circuitry 58 from being activated when the IC 46 is powered up for operation by the $V_{DD}$ voltage. By activating the ESD clamping circuitry 58 based on the trigger voltage ($V_{TRG}$) and the ESD threshold voltage ($V_{ESD}$), as opposed to relying on voltage rise time, it is possible to prevent the ESD clamping circuitry 58 from missing the voltage spike 48 when the voltage spike 48 is associated with a slow rise time or being falsely activated by the $V_{DD}$ voltage associated with a fast rise time.

With continuing reference to FIG. 2, the ESD clamping circuitry 58 includes a first bipolar transistor 72 and a second bipolar transistor 74 disposed according to a Darlington pair arrangement. In a non-limiting example, the first bipolar transistor 72 and the second bipolar transistor 74 are N-type-P-type-N-type (NPN) bipolar transistors. According to the Darlington pair arrangement, a first bipolar transistor emitter electrode 76 is coupled to a second bipolar transistor base electrode 78. A first bipolar transistor collector electrode 80 and a second bipolar transistor collector electrode 82 are both coupled to the supply rail 50. A second bipolar transistor emitter electrode 84 is coupled to the ground rail 52. A first bipolar transistor base electrode 86 is coupled to the latch circuitry 56 to receive the activation signal 70. In a non-limiting example, the first bipolar transistor 72 and the second bipolar transistor 74 are both current-operated devices.

When the activation signal 70 (logical high) is applied between the first bipolar transistor base electrode 86 and the ground rail 52, a small current ($I_0$) through the first bipolar transistor base electrode 86 will cause a first bipolar transistor current ($I_1$), which is larger than the small current ($I_0$), between the first bipolar transistor collector electrode 80 and the first bipolar transistor emitter electrode 76. When the first bipolar transistor current ($I_1$) is applied to the second bipolar transistor base electrode 78, the first bipolar transistor current ($I_1$) will trigger a second bipolar transistor current ($I_2$), which is larger than the first bipolar transistor current ($I_1$), between the second bipolar transistor collector electrode 82 and the second bipolar transistor emitter electrode 84. The first bipolar transistor 72 and the second bipolar transistor 74 are current-amplifying devices, because the second bipolar transistor current ($I_2$) is greater than the first bipolar transistor current ($I_1$) which is greater than the small current ($I_0$) ($I_2 > I_1 > I_0$). As a result, when activated by the activation signal 70, the ESD clamping circuitry 58 can instantaneously discharge an ESD current ($I_{ESD}$) ($I_{ESD} = I_0 + I_1 + I_2$) associated with the voltage spike 48. In a non-limiting example, the second bipolar transistor current ($I_2$) accounts for over ninety percent (90%) of the ESD current ($I_{ESD}$).

The first bipolar transistor base electrode 86 is further coupled to the ground rail 52 via a clamping circuitry resistor 87. The clamping circuitry resistor 87 is configured to increase collector-emitter breakdown voltage of the first bipolar transistor 72, thus preventing the ESD clamping circuitry 58 from being activated prematurely. In a non-limiting example, if the clamping circuitry resistor 87 is not provided, the collector-emitter breakdown voltage of the first bipolar transistor 72 is six volts (6 V). With the clamping circuitry resistor 87, the collector-emitter breakdown voltage can be increased to ten volts (10 V). Typically, the smaller the resistance of the clamping circuitry resistor 87, the higher the emitter-collector breakdown voltage in the first bipolar transistor 72 may result.

The delay circuitry 60 includes a resistor 88 and a capacitor 90 disposed between the supply rail 50 and the ground rail 52 according to a serial arrangement. In this regard, the delay circuitry 60 is also known as a resistor-capacitor (RC) circuitry. The delay circuitry 60 is coupled to the latch circuitry 56 at a coupling point 92 located between the resistor 88 and the capacitor 90.

The latch circuitry 56 includes a negative-AND (NAND) gate 94, a first inverter 96, and a second inverter 98. The NAND gate 94 includes a first gate input terminal 100 configured to receive a first gate input signal 102. The NAND gate 94 also includes a second gate input terminal 104 configured to receive a second gate input signal 106. The NAND gate 94 also includes a gate output terminal 108 configured to output a gate output signal 110. The NAND gate 94 receives the first gate input signal 102 and the second gate input signal 106 as a combination of logical high and logical low. The NAND gate 94 generates the gate output signal 110 as logical low when the first gate input signal 102 and the second gate input signal 106 are both asserted as logical high. Otherwise, the NAND gate 94 generates the gate output signal 110 as logical low.

The first inverter 96 includes a first inverter input terminal 112 and a first inverter output terminal 114. The first inverter input terminal 112 is coupled to the coupling point 92 of the delay circuitry 60 to receive a delay circuitry output signal 116. The first inverter 96 is configured to invert the delay circuitry output signal 116 to generate the first gate input signal 102. In this regard, if the delay circuitry output signal 116 is logical low, the first gate input signal 102 will be logical high. If the delay circuitry output signal 116 is logical high, the first gate input signal 102 will be logical low.

The second inverter 98 includes a second inverter input terminal 117 and a second inverter output terminal 118. The second inverter input terminal 117 is coupled to the gate output terminal 108 to receive the gate output signal 110. The second inverter 98 is configured to invert the gate output signal 110 to generate a control signal 120. The second inverter output terminal 118 is coupled to the first bipolar transistor base electrode 86 in the ESD clamping circuitry 58.

The second gate input terminal 104 is coupled to the trigger circuitry 54 by a diode 122. The diode 122 includes an anode 124 and a cathode 126. The anode 124 is coupled to the output point 68 of the trigger circuitry 54 and the cathode 126 is coupled to the second gate input terminal 104 of the latch circuitry 56. In this regard, when the trigger voltage ($V_{TRG}$) exceeds the ESD threshold voltage ($V_{ESD}$), the diode 122 is forward-biased to provide the second gate input signal 106 as logical high. In contrast, if the trigger voltage ($V_{TRG}$) is less than the ESD threshold voltage ($V_{ESD}$), the diode 122 becomes reverse-biased, thus asserting the second gate input signal 106 as logical low.

With continuing reference to FIG. 2, when the voltage spike 48 does not occur between the supply rail 50 and the ground rail 52, the capacitor 90 is not charged, and the voltage at the coupling point 92 is pulled down to the ground rail 52. Accordingly, the delay circuitry 60 generates the delay circuitry output signal 116 as logical low. The first inverter 96 inverts the delay circuitry output signal 116 to provide the first gate input signal 102 as logical high.

Concurrently, the trigger voltage ($V_{TRG}$) provided by the trigger circuitry 54 is lower than the ESD threshold voltage ($V_{ESD}$). As a result, the second gate input signal 106 is asserted as logical low. As discussed above, the NAND gate 94 generates the gate output signal 110 as logical high. The second inverter 98 inverts the gate output signal 110 to provide the control signal 120 as logical low, thus keeping the ESD clamping circuitry 58 deactivated.

When the ESD event occurs in the IC 46, the voltage spike 48 between the supply rail 50 and the ground rail 52 causes the trigger voltage ($V_{TRG}$) to exceed the ESD threshold voltage ($V_{TRG}$>$V_{ESD}$). Accordingly, the diode 122 is forward biased to provide the second gate input signal 106 as logical high. Because the capacitor 90 cannot be charged up to the voltage level of the voltage spike 48 instantaneously, the voltage at the coupling point 92 will not change instantaneously either. As a result, the delay circuitry 60 still generates the delay circuitry output signal 116 as logical low. The first inverter 96 inverts the delay circuitry output signal 116 to provide the first gate input signal 102 as logical high. The NAND gate 94 now receives the first gate input signal 102 as logical high and the second gate input signal 106 as logical high. As a result, the gate output signal 110 becomes logical low. The second inverter 98 inverts the gate output signal 110 to provide the activation signal 70 as logical high, thus activating the ESD clamping circuitry 58 to discharge the ESD current ($I_{ESD}$).

With continuing reference to FIG. 2, the second inverter output terminal 118 is coupled to the cathode 126 by a loopback resistor 128. As such, when the second inverter 98 provides the activation signal 70 as logical high on the second inverter output terminal 118, the cathode 126 is pulled up to cause the diode 122 to be reverse-biased. Consequently, the latch circuitry 56 is decoupled from the trigger circuitry 54. In contrast, if the latch circuitry 56 is coupled directly to the trigger circuitry 54 without the diode 122, the trigger voltage ($V_{TRG}$) may not be able to activate the latch circuitry 56 as the second gate input signal 106 will not be allowed to rise beyond the trigger voltage ($V_{TRG}$).

The duration needed by the capacitor 90 to charge up to the voltage spike 48 depends on an RC time constant (τ) of the delay circuitry 60, which is configured as an RC charging circuit. The RC time constant (τ) is expressed as the multiplication of a resistance of the resistor 88 and a capacitance of the capacitor 90. When the capacitor 90 is charged up, the delay circuitry 60 generates the delay circuitry output signal 116 as logical high. The first inverter 96 inverts the delay circuitry output signal 116 to generate the first gate input signal 102 as logical low. Since the trigger circuitry 54 has been decoupled from the second gate input terminal 104 by the diode 122, the second gate input signal 106 remains as logical high. As a result, the NAND gate 94 receives the first gate input signal 102 as logical low and the second gate input signal 106 as logical high. Hence, the gate output signal 110 becomes logical high. The second inverter 98 inverts the gate output signal 110 to generate the control signal 120 as logical low, thus deactivating the ESD clamping circuitry 58. Since RC time constant (τ) of the delay circuitry 60 is used to automatically deactivate the ESD clamping circuitry 58, the RC time constant (τ) needs to be fine-tuned to provide sufficient time for the ESD clamping circuitry 58 to discharge the ESD event. The RC time constant (τ) of the delay circuitry 60 corresponds to a predetermined protection period of the ESD protection circuit 44.

Figure 3:
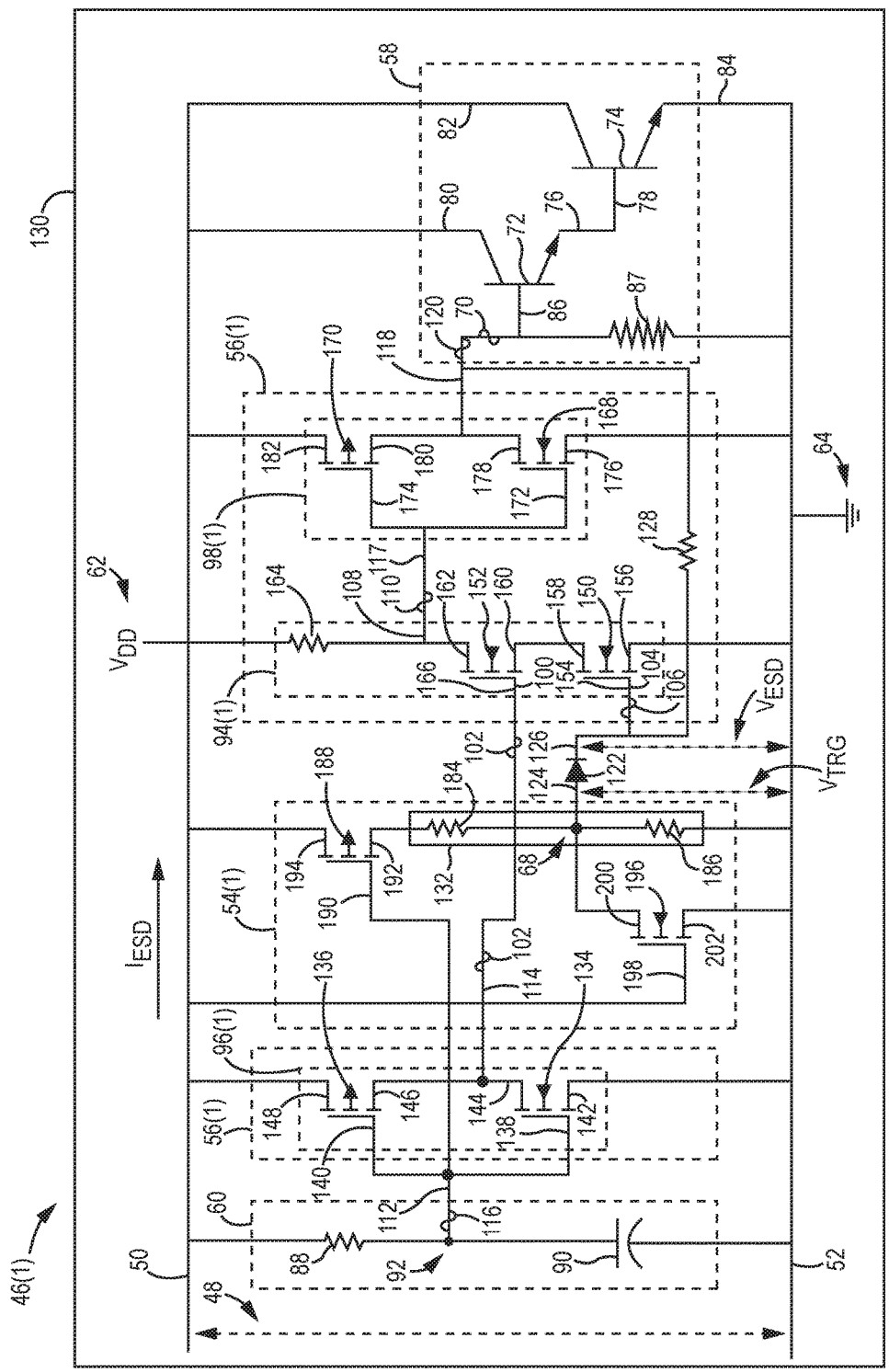
FIG. 3 is a schematic diagram of an exemplary ESD protection circuit including trigger circuitry in which a resistor divider is configured to divide the voltage spike of FIG. 2 to provide the trigger voltage ($V_{TRG}$) for detecting and discharging an ESD event in an IC.

In one non-limiting example, the voltage divider 66 can be implemented as a resistor divider. In this regard, FIG. 3 is a schematic diagram of an exemplary ESD protection circuit 130 including trigger circuitry 54(1) in which a resistor divider 132 is configured to divide the voltage spike 48 of FIG. 2 to provide the trigger voltage ($V_{TRG}$) for detecting and discharging an ESD event in an IC 46(1). Common elements between FIGS. 2 and 3 are shown therein with common element numbers and will not be re-described herein.

With reference to FIG. 3, the ESD protection circuit 130 includes the delay circuitry 60, the trigger circuitry 54(1), latch circuitry 56(1), and the ESD clamping circuitry 58. The latch circuitry 56(1) includes an NAND gate 94(1), a first inverter 96(1), and a second inverter 98(1). The first inverter 96(1) is a complementary metal-oxide semiconductor (MOS) (CMOS) device including a first n-type MOS (nMOS) transistor 134 and a first p-type MOS (pMOS) transistor 136. A first nMOS transistor gate electrode 138 and a first pMOS transistor gate electrode 140 are coupled to provide the first inverter input terminal 112, which is coupled to the coupling point 92 in the delay circuitry 60. The first nMOS transistor 134 includes a first nMOS transistor drain electrode 142 coupled to the ground rail 52. A first nMOS transistor source electrode 144 in the first nMOS transistor 134 and a first pMOS transistor source electrode 146 in the first pMOS transistor 136 are coupled to provide the first inverter output terminal 114. The first pMOS transistor 136 also includes a first pMOS transistor drain electrode 148 coupled to the supply rail 50.

The NAND gate 94(1) includes a second nMOS transistor 150 and a third nMOS transistor 152. The second nMOS transistor 150 has a second nMOS transistor gate electrode 154 coupled to the cathode 126 of the diode 122. In this regard, the second nMOS transistor gate electrode 154 is also the second gate input terminal 104 of the NAND gate 94 in FIG. 2. The second nMOS transistor 150 has a second nMOS transistor drain electrode 156 coupled to the ground rail 52. The second nMOS transistor 150 also has a second nMOS transistor source electrode 158 coupled to a third nMOS transistor drain electrode 160 in the third nMOS transistor 152. The third nMOS transistor 152 has a third nMOS transistor source electrode 162 coupled to a load resistor 164, which is coupled to the supply rail 50. The load resistor 164 is provided herein to ensure that the latch circuitry 56(1) is in an off state and the ESD clamping circuitry 58 is deactivated when the IC 46(1) is powered up. The third nMOS transistor 152 also includes a third nMOS transistor gate electrode 166 coupled to the first inverter output terminal 114. In this regard, the third nMOS transistor gate electrode 166 provides the first gate input terminal 100 in the NAND gate 94 in FIG. 2.

To activate the ESD clamping circuitry 58 to discharge the voltage spike 48, the NAND gate 94(1) needs to provide the gate output signal 110 to the second inverter 98(1) as logical low. Accordingly, the first gate input signal 102 and the second gate input signal 106 of the NAND gate 94(1) both need to be asserted as logical high to cause source-drain breakdowns in the second nMOS transistor 150 and the third nMOS transistor 152, respectively. As such, the ESD threshold voltage ($V_{ESD}$), which is applied between the second nMOS transistor gate electrode 154 (as well as the cathode 126) and the ground rail 52, needs to be no less than a source-drain threshold voltage ($V_{TH}$) of the second nMOS transistor 150.

The second inverter 98(1) is also a CMOS device comprising a fourth nMOS transistor 168 and a second pMOS transistor 170. A fourth nMOS transistor gate electrode 172 in the fourth nMOS transistor 168 and a second pMOS transistor gate electrode 174 in the second pMOS transistor 170 are coupled to provide the second inverter input terminal 117 and to receive the gate output signal 110 from the NAND gate 94(1). The fourth nMOS transistor gate electrode 172 and the second pMOS transistor gate electrode 174 are coupled to the supply rail 50 through the load resistor 164. The fourth nMOS transistor 168 also has a fourth nMOS transistor drain electrode 176 coupled to the ground rail 52. The fourth nMOS transistor 168 has a fourth nMOS transistor source electrode 178 coupled to a second pMOS transistor source electrode 180 in the second pMOS transistor 170. In this regard, the fourth nMOS transistor source electrode 178 and the second pMOS transistor source electrode 180 provide the second inverter output terminal 118 and the control signal 120. The second pMOS transistor 170 has a second pMOS transistor drain electrode 182 coupled to the supply rail 50.

The trigger circuitry 54(1) includes the resistor divider 132. The resistor divider 132 includes a first resistor 184 disposed between the supply rail 50 and the output point 68. The resistor divider 132 also includes a second resistor 186 disposed between the output point 68 and the ground rail 52. In this regard, the first resistor 184 and the second resistor 186 are disposed according to a serial arrangement in the resistor divider 132. The output point 68 of the resistor divider 132 is coupled to the anode 124 of the diode 122. The resistor divider 132 is configured to provide the trigger voltage ($V_{TRG}$) between the output point 68 and the ground rail 52.

The trigger circuitry 54(1) also includes a leakage reduction transistor 188 disposed between the supply rail 50 and the first resistor 184. In a non-limiting example, the leakage reduction transistor 188 is a pMOS transistor including a third pMOS transistor gate electrode 190, a third pMOS transistor source electrode 192, and a third pMOS transistor drain electrode 194. The third pMOS transistor source electrode 192 is coupled to the first resistor 184, and the third pMOS transistor drain electrode 194 is coupled to the supply rail 50. The third pMOS transistor gate electrode 190 is coupled to the coupling point 92 in the delay circuitry 60 to receive the delay circuitry output signal 116.

When the IC 46(1) is in powered up for operation by the $V_{DD}$ voltage, voltage at the coupling point 92 is pulled up to the $V_{DD}$ voltage, thus causing the delay circuitry output signal 116 to become logical high. Since the $V_{DD}$ voltage is lower than the voltage spike 48 associated with the ESD event, the trigger voltage ($V_{TRG}$), which is divided from the $V_{DD}$ voltage, will be less than the ESD threshold voltage ($V_{ESD}$) as well. When the delay circuitry output signal 116 is applied to the third pMOS transistor gate electrode 190, minimal current can flow from the third pMOS transistor drain electrode 194 to the third pMOS transistor source electrode 192. As such, the leakage reduction transistor 188 is able to reduce leakage current flowing through the resistor divider 132 when the trigger voltage ($V_{TRG}$) is less than the ESD threshold voltage ($V_{ESD}$).

With continuing reference to FIG. 3, the trigger circuitry 54(1) includes a variation-offset transistor 196 disposed in parallel to the second resistor 186 in the resistor divider 132. In a non-limiting example, the variation-offset transistor 196 is an nMOS transistor. The variation-offset transistor 196 includes a fifth nMOS transistor gate electrode 198, a fifth nMOS transistor source electrode 200, and a fifth nMOS transistor drain electrode 202. The fifth nMOS transistor gate electrode 198 is coupled to the supply rail 50. The fifth nMOS transistor source electrode 200 is coupled to the output point 68 of the resistor divider 132. The fifth nMOS transistor drain electrode 202 is coupled to the ground rail 52.

The variation-offset transistor 196 is configured to offset ESD threshold voltage variations in the latch circuitry 56(1). As discussed above, the ESD threshold voltage ($V_{ESD}$) is related to the source-drain threshold voltage ($V_{TH}$) of the second nMOS transistor 150 in the latch circuitry 56(1). However, fabrication process variation can cause the source-drain threshold voltage ($V_{TH}$) of the second nMOS transistor 150 to vary (e.g., higher or lower) from one latch circuitry to another latch circuitry. Without the variation-offset transistor 196, the trigger voltage ($V_{TRG}$) provided by the trigger circuitry 54(1) may become too low when the source-drain threshold voltage ($V_{TH}$) of the second nMOS transistor 150 is decreased by the fabrication process variation. As a result, the latch circuitry 56(1) can cause the ESD clamping circuitry 58 to be activated prematurely. In contrast, the trigger voltage ($V_{TRG}$) provided by the trigger circuitry 54(1) may become too high when the source-drain threshold voltage ($V_{TH}$) of the second nMOS transistor 150 is increased by the fabrication process variation. Consequently, the latch circuitry 56(1) may not be able to activate the ESD clamping circuitry 58 in time when the voltage spike 48 occurs. In this regard, the latch circuitry 56(1) may become unreliable as a result of the fabrication process variation.

In a non-limiting example, the source-drain threshold voltage ($V_{TH}$) of the variation-offset transistor 196 is substantially identical to the source-drain threshold voltage ($V_{TH}$) of the second nMOS transistor 150. As such, when the fabrication process variation causes the source-drain threshold voltage ($V_{TH}$) of the second nMOS transistor 150 to vary, the source-drain threshold voltage ($V_{TH}$) of the variation-offset transistor 196 will vary accordingly. Therefore, the variation-offset transistor 196 may offset ESD threshold voltage variations of the second nMOS transistor 150, thus improving reliability of the latch circuitry 56(1).

With continuing reference to FIG. 3, with the first resistor 184, the second resistor 186, the leakage reduction transistor 188, and the variation-offset transistor 196 in the trigger circuitry 54(1), the trigger voltage ($V_{TRG}$) provided between the output point 68 and the ground rail 52 can be determined based on the equation (Eq. 1) below.

$$V_{TRG} = V_{DD} \times (R_B \| R_{ON2}) / (R_{ON1} + R_A + (R_B \| R_{ON2})) \quad \text{(Eq. 1)}$$

In equation (Eq. 1), $R_A$ is the resistance of the first resistor 184. $R_B$ is the resistance of the second resistor 186. $R_{ON1}$ is the on-resistance of the leakage reduction transistor 188. $R_{ON2}$ is the on-resistance of the variation-offset transistor 196. ($R_B \| R_{ON2}$) refers to the parallel resistance of the second resistor 186 and the variation-offset transistor 196, which may be calculated by the equation (Eq. 1.1) below.

$$1/(R_B \| R_{ON2}) = 1/R_B + 1/R_{ON2} \quad \text{(Eq. 1.1)}$$

Accordingly, the trigger voltage ($V_{TRG}$) provided between the cathode 126 and the ground rail 52 can be determined based on the following equation (Eq. 2).

$$V_{TRG} = V_{TH} + V_D \quad \text{(Eq. 2)}$$

In equation (Eq. 2), $V_D$ is the voltage across the diode 122 when the diode 122 is forward-biased. In this regard, in a non-limiting example, if the source-drain threshold voltage ($V_{TH}$) is chosen to equal to the threshold voltage ($V_{TH}$) of the second nMOS transistor 150, the trigger voltage ($V_{TRG}$) needs to be at least the sum of the source-drain threshold voltage ($V_{TH}$) and the voltage across the diode 122 ($V_D$) to cause the source-drain threshold voltage ($V_{TH}$) to rise above the source-drain threshold voltage ($V_{TH}$) in the second nMOS transistor 150.

Figure 4A:
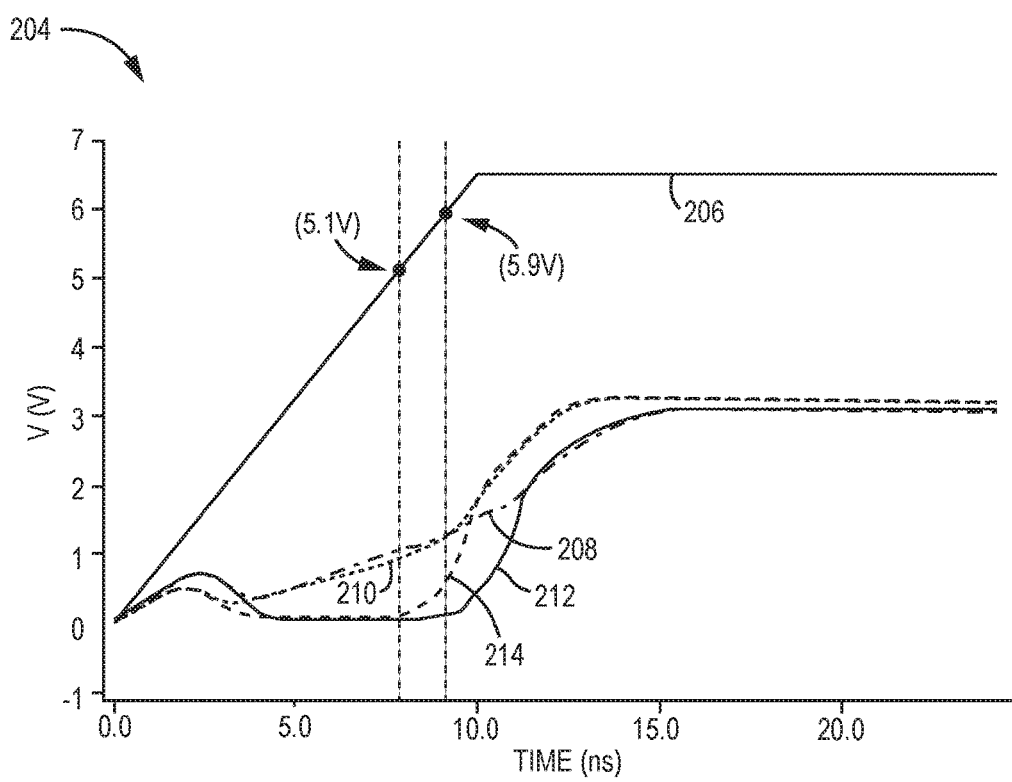
FIG. 4A is a plot providing an exemplary illustration of the trigger circuitry of FIG. 3 under different temperatures.

The trigger circuitry 54(1) needs to perform reliably in spite of temperature variations. In this regard, FIG. 4A is a plot 204 providing an exemplary illustration of the trigger circuitry 54(1) of FIG. 3 under different temperatures. Elements of FIG. 3 are referenced in connection with FIG. 4A and will not be re-described herein.

With reference to FIG. 4A, the plot 204 includes a circuit voltage curve 206 indicating voltage applied between the supply rail 50 and the ground rail 52 of FIG. 3. The plot 204 includes a first trigger voltage curve 208 and a second trigger voltage curve 210. The first trigger voltage curve 208 indicates a divider voltage, which is between the output point 68 and the ground rail 52, provided by the trigger circuitry 54(1) of FIG. 3 under a temperature of twenty-five degrees centigrade (25 C.°). The second trigger voltage curve 210 indicates the divider voltage provided by the trigger circuitry 54(1) under a temperature of one hundred ten degrees centigrade (110 C.°). The plot 204 also includes a first control signal curve 212 and a second control signal curve 214. The first control signal curve 212 represents the control signal 120 provided to the ESD clamping circuitry 58 by the latch circuitry 56(1) of FIG. 3 under a temperature of 25 C.°. The second control signal curve 214 represents the control signal 120 provided to the ESD clamping circuitry 58 by the latch circuitry 56(1) under a temperature of 110 C.°.

According to the circuit voltage curve 206 and the first control signal curve 212, the ESD clamping circuitry 58 remains off when the voltage between the supply rail 50 and the ground rail 52 is lower than five point one volts (5.1 V) under a temperature of 25 C.°. Likewise, according to the circuit voltage curve 206 and the second control signal curve 214, the ESD clamping circuitry 58 also remains off when the voltage between the supply rail 50 and the ground rail 52 is lower than five point nine volts (5.9 V) under a temperature of 110 C.°. As such, the ESD clamping circuitry 58 will not be activated prematurely. Furthermore, the first control signal curve 212 and the second control signal curve 214 indicate that the control signal 120 is asserted as logical high to activate the ESD clamping circuitry 58 when the voltage between the supply rail 50 and the ground rail 52 rises to 5.9 V under temperature of 110 C.°. As such, the trigger circuitry 54(1) can cause the latch circuitry 56(1) to activate the ESD clamping circuitry 58 before the voltage between the supply rail 50 and the ground rail 52 rise too much, damaging the IC 46(1).

Figure 4B:
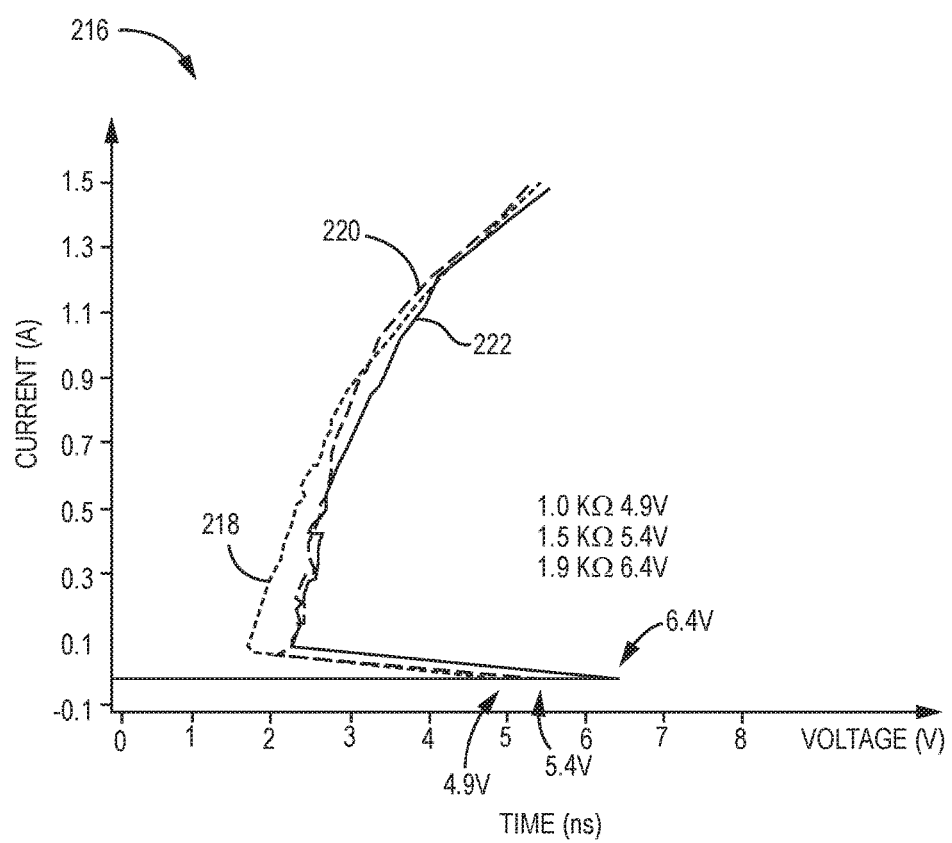
FIG. 4B is a plot providing an exemplary illustration of a relationship between the trigger voltage ($V_{TRG}$) of FIG. 3 and resistance of a resistor in the resistor divider.

With reference back to FIG. 3, according to the equation (Eq. 1) above, the trigger voltage ($V_{TRG}$) generated by the trigger circuitry 54(1) is proportional to resistance of the second resistor 186 in the resistor divider 132. In this regard, FIG. 4B is a plot 216 providing an exemplary illustration of a relationship between the trigger voltage ($V_{TRG}$) of FIG. 3 and resistance of the second resistor 186 in the resistor divider 132. Elements of FIG. 3 are referenced in connection with FIG. 4B and will not be re-described herein.

With reference to FIG. 4B, the plot 216 includes a first current curve 218, a second current curve 220, and a third current curve 222. The first current curve 218 is plotted when resistance of the second resistor 186 in the resistor divider 132 of FIG. 3 is one kilo-ohms (1 KΩ). The first current curve 218 indicates that the trigger voltage ($V_{TRG}$) generated by the resistor divider 132 is approximately four point nine volts (4.9 V). The second current curve 220 is plotted when resistance of the second resistor 186 in the resistor divider 132 is one point five kilo-ohms (1.5 KΩ). The second current curve 220 indicates that the trigger voltage ($V_{TRG}$) generated by the resistor divider 132 is approximately five point four volts (5.4 V). The third current curve 222 is plotted when resistance of the second resistor 186 in the resistor divider 132 is one point nine kilo-ohms (1.9 KΩ). The third current curve 222 indicates that the trigger voltage ($V_{TRG}$) generated by the resistor divider 132 is approximately six point four volts (6.4 V).

Figure 5:
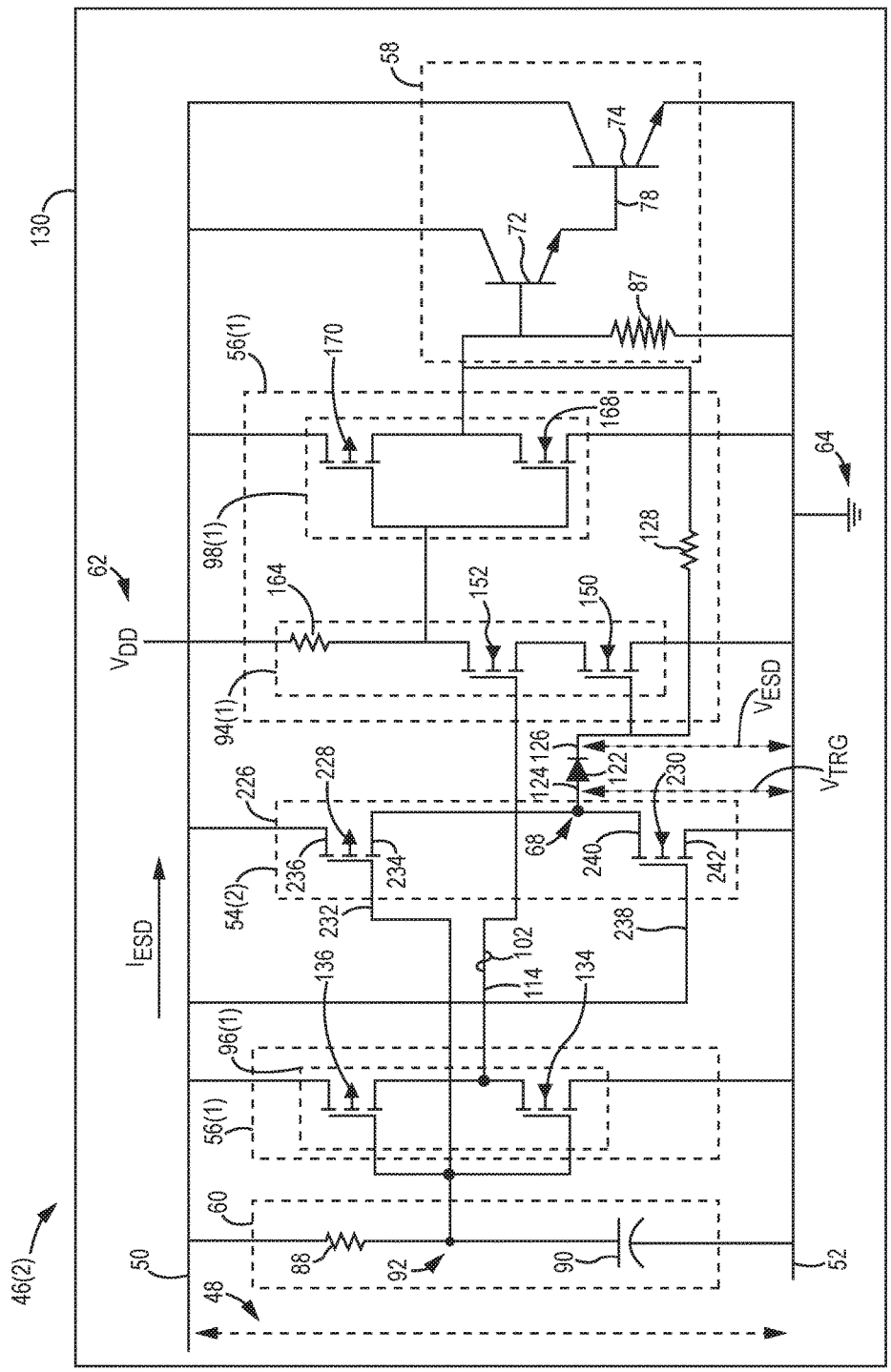
FIG. 5 is a schematic diagram of an exemplary ESD protection circuit that includes trigger circuitry configured to generate the trigger voltage ($V_{TRG}$) of FIG. 3 based on a p-type-n-type (P-N) transistor divider for detecting and discharging an ESD event in an IC.

With reference back to FIG. 3, alternative to generating the trigger voltage ($V_{TRG}$) from the trigger circuitry 54(1) based on the resistor divider 132, it is possible to generate the trigger voltage ($V_{TRG}$) based on a transistor divider or a hybrid voltage divider, as discussed below with reference to FIGS. 5-7. In this regard, FIG. 5 is a schematic diagram of an exemplary ESD protection circuit 224 that includes trigger circuitry 54(2) configured to generate the trigger voltage ($V_{TRG}$) of FIG. 3 based on a p-type-n-type (P-N) transistor divider 226 for detecting and discharging an ESD event in an IC 46(2). Common elements between FIGS. 3 and 5 are shown therein with common element numbers and will not be re-described herein.

With reference to FIG. 5, the P-N transistor divider 226 includes a first P-N transistor divider transistor (first P-N transistor) 228 and a second P-N transistor divider transistor (second P-N transistor) 230. In a non-limiting example, the first P-N transistor 228 is a pMOS transistor and the second P-N transistor 230 is an nMOS transistor. The first P-N transistor 228 includes a first P-N transistor gate electrode 232, a first P-N transistor source electrode 234, and a first P-N transistor drain electrode 236. The first P-N transistor gate electrode 232 is coupled to the coupling point 92 in the delay circuitry 60. The first P-N transistor source electrode 234 is coupled to the output point 68 of the P-N transistor divider 226. The first P-N transistor drain electrode 236 is coupled to the supply rail 50. The second P-N transistor 230 includes a second P-N transistor gate electrode 238, a second P-N transistor source electrode 240, and a second P-N transistor drain electrode 242. The second P-N transistor gate electrode 238 is coupled to the supply rail 50. The second P-N transistor source electrode 240 is coupled to the output point 68 of the trigger circuitry 54(2). The second P-N transistor drain electrode 242 is coupled to the ground rail 52.

With continuing reference to FIG. 5, with the first P-N transistor 228 and the second P-N transistor 230 in the trigger circuitry 54(2), the trigger voltage ($V_{TRG}$) provided between the output point 68 and the ground rail 52 can be determined based on the equation (Eq. 3) below.

$$V_{TRG}=V_{DD}\times R_{ON2}/(R_{ON1}+R_{ON2}) \qquad (Eq. 3)$$

In equation (Eq. 3), $R_{ON1}$ is the on-resistance of the first P-N transistor 228. $R_{ON2}$ is the on-resistance of the second P-N transistor 230.

Figure 6:
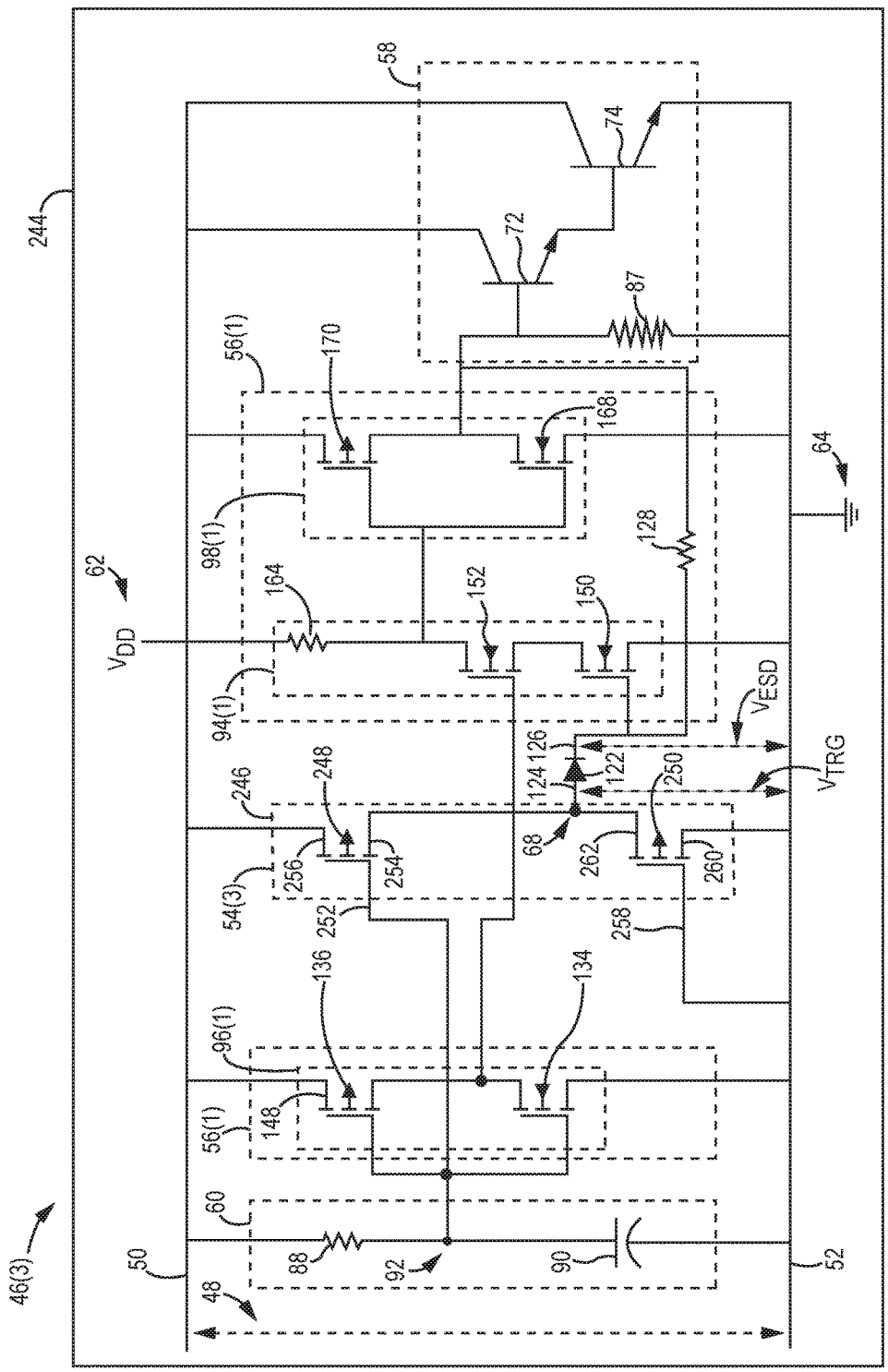
FIG. 6 is a schematic diagram of an exemplary ESD protection circuit that includes trigger circuitry configured to generate the trigger voltage ($V_{TRG}$) of FIG. 3 based on a p-type-p-type (P-P) transistor divider for detecting and discharging an ESD event in an IC.

FIG. 6 is a schematic diagram of an exemplary ESD protection circuit 244 that includes trigger circuitry 54(3) configured to generate the trigger voltage ($V_{TRG}$) of FIG. 3 based on a p-type-p-type (P-P) transistor divider 246 for detecting and discharging an ESD event in an IC 46(3). Common elements between FIGS. 3 and 6 are shown therein with common element numbers and will not be re-described herein.

With reference to FIG. 6, the P-P transistor divider 246 includes a first P-P transistor divider transistor (first P-P transistor) 248 and a second P-P transistor divider transistor (second P-P transistor) 250. In a non-limiting example, the first P-P transistor 248 and the second P-P transistor 250 are pMOS transistors. The first P-P transistor 248 includes a first P-P transistor gate electrode 252, a first P-P transistor source electrode 254, and a first P-P transistor drain electrode 256. The first P-P transistor gate electrode 252 is coupled to the coupling point 92 in the delay circuitry 60. The first P-P transistor source electrode 254 is coupled to the output point 68 of the P-P transistor divider 246. The first P-P transistor drain electrode 256 is coupled to the supply rail 50. The second P-P transistor 250 includes a second P-P transistor gate electrode 258, a second P-P transistor source electrode 260, and a second P-P transistor drain electrode 262. The second P-P transistor gate electrode 258 is coupled to the ground rail 52. The second P-P transistor source electrode 260 is coupled to ground rail 52. The second P-P transistor drain electrode 262 is coupled to the output point 68 of the trigger circuitry 54(3).

With continuing reference to FIG. 6, with the first P-P transistor 248 and the second P-P transistor 250 in the trigger circuitry 54(3), the trigger voltage ($V_{TRG}$) provided between the output point 68 and the ground rail 52 can be determined based on the equation (Eq. 4) below.

$$V_{TRG} = V_{DD} \times R_{ON2}/(R_{ON1} + R_{ON2}) \qquad (Eq.\ 4)$$

In equation (Eq. 4), $R_{ON1}$ is the on-resistance of the first P-P transistor 248. $R_{ON2}$ is the on-resistance of the second P-P transistor 250.

Figure 7:
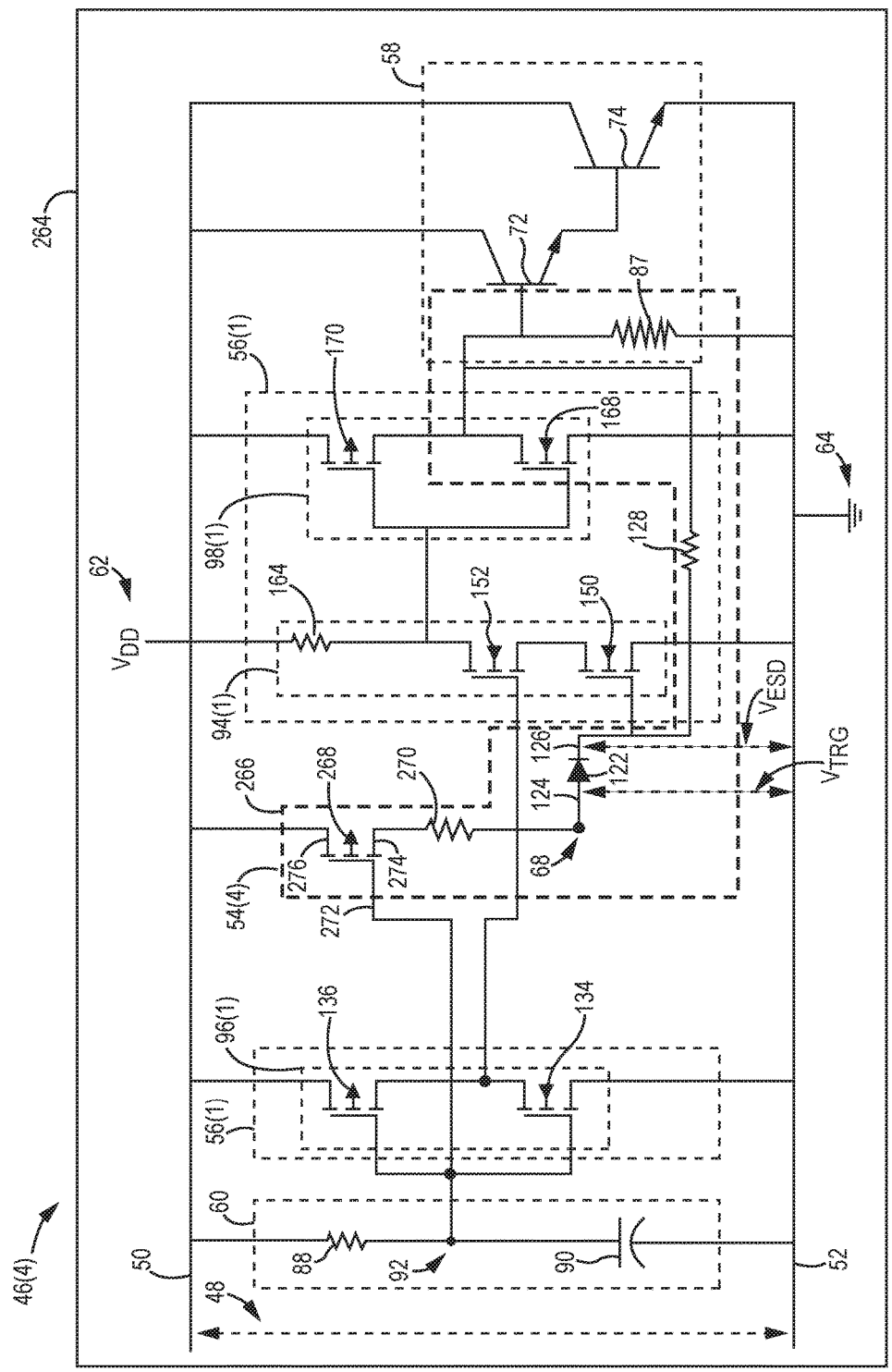
FIG. 7 is a schematic diagram of an exemplary ESD protection circuit that includes trigger circuitry configured to generate the trigger voltage ($V_{TRG}$) of FIG. 3 based on a hybrid voltage divider for detecting and discharging an ESD event in an IC.

FIG. 7 is a schematic diagram of an exemplary ESD protection circuit 264 that includes trigger circuitry 54(4) configured to generate the trigger voltage ($V_{TRG}$) of FIG. 3 based on a hybrid voltage divider 266 for detecting and discharging an ESD event in an IC 46(4). Common elements between FIGS. 3 and 7 are shown therein with common element numbers and will not be re-described herein.

With reference to FIG. 7, the hybrid voltage divider 266 includes a pMOS transistor 268, a resistor 270, the diode 122, the loopback resistor 128, the clamping circuitry resistor 87, and the fourth nMOS transistor 168. The pMOS transistor 268 includes a gate electrode 272, a source electrode 274, and a drain electrode 276. The gate electrode 272 is coupled to the coupling point 92 in the delay circuitry 60. The drain electrode 276 is coupled to the supply rail 50, and the source electrode 274 is coupled to the resistor 270, which is coupled to the output point 68.

With the pMOS transistor 268, the resistor 270, the diode 122, the loopback resistor 128, the clamping circuitry resistor 87, and the fourth nMOS transistor 168 in the trigger circuitry 54(4), the trigger voltage ($V_{TRG}$) provided between the output point 68 and the ground rail 52 can be determined based on the equation (Eq. 5) below.

$$V_{TRG} = (V_{DD} - V_D) \times [R_A + (R_B \| R_{ON2})]/(R_{ON1} + R_A + R_C + (R_B \| R_{ON2})) \qquad (Eq.\ 5)$$

In equation (Eq. 5), $V_D$ is the voltage across the diode 122 when the diode 122 is forward biased. $R_A$ is resistance of the loopback resistor 128. $R_B$ resistance of the clamping circuitry resistor 87. $R_{ON2}$ is the on-resistance of the fourth nMOS transistor 168. $R_{ON1}$ is the on-resistance of the pMOS transistor 268. $R_C$ is resistance of the resistor 270. ($R_B \| R_{ON2}$) refers to the parallel resistance of the clamping circuitry resistor 87 and the fourth nMOS transistor 168, which may be calculated by the equation (Eq. 5.1) below.

$$1/(R_B \| R_{ON2}) = 1/R_B + 1/R_{ON2} \qquad (Eq.\ 5.1)$$

Figure 8:
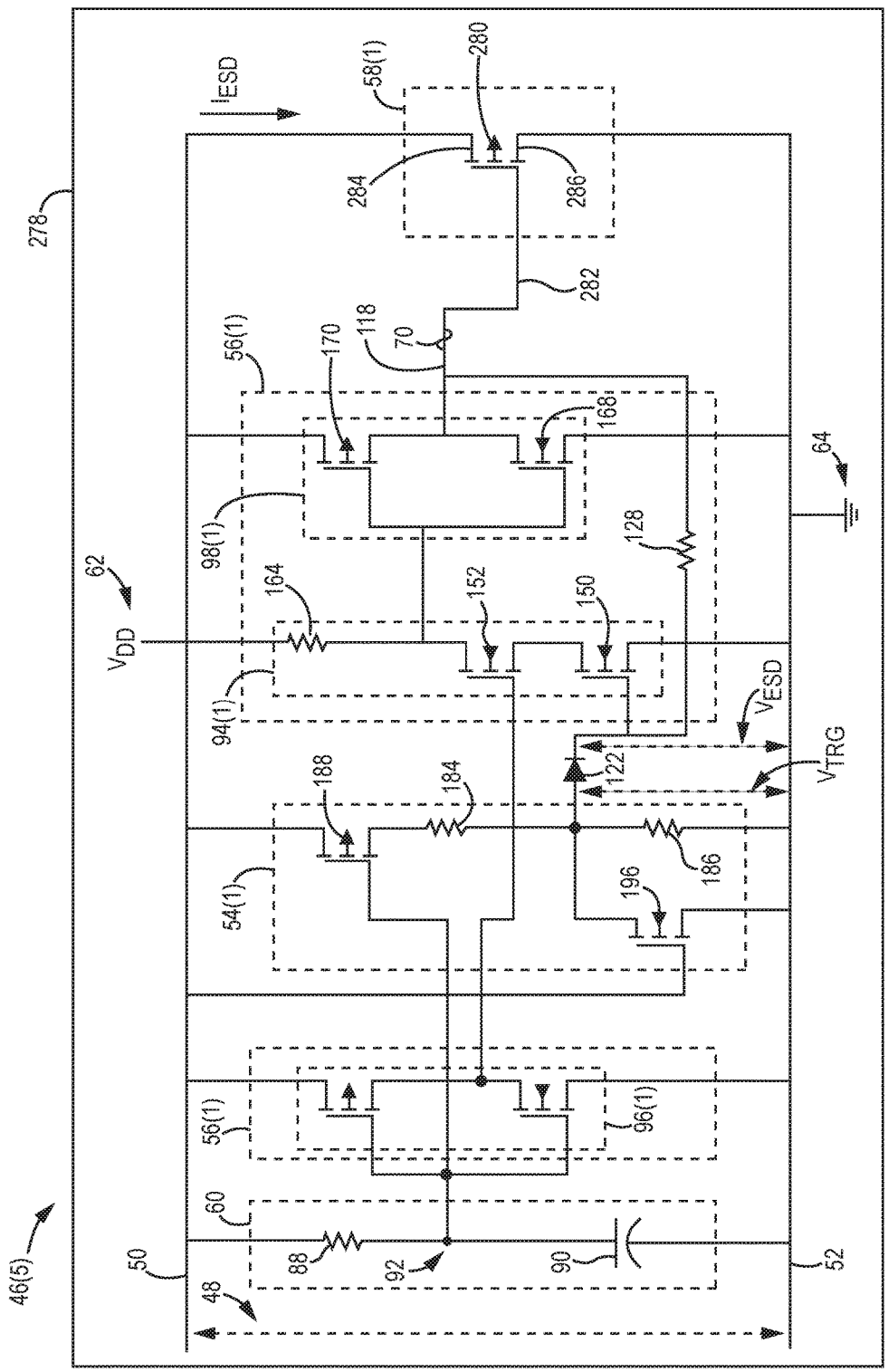
FIG. 8 is a schematic diagram of an exemplary ESD protection circuit including an ESD clamping circuitry in which an n-type metal-oxide semiconductor (nMOS) transistor is configured to discharge an ESD event in an IC.

With reference back to FIG. 3, in a non-limiting example, it is possible to replace the first bipolar transistor 72 and the second bipolar transistor 74 in the ESD clamping circuitry 58 with a transistor. In this regard, FIG. 8 is a schematic diagram of an exemplary ESD protection circuit 278 including an ESD clamping circuitry 58(1) in which an nMOS transistor 280 is configured to discharge an ESD event in an IC 46(5). Common elements between FIGS. 3 and 8 are shown therein with common element numbers and will not be re-described herein.

With reference to FIG. 8, the nMOS transistor 280 includes an nMOS transistor gate electrode 282 coupled to the second inverter output terminal 118 in the latch circuitry 56(1). The nMOS transistor 280 includes an nMOS transistor source electrode 284 coupled to the supply rail 50. The nMOS transistor 280 includes an nMOS transistor drain electrode 286 coupled to the ground rail 52. When the latch circuitry 56(1) generates the activation signal 70 as logical high, the ESD current $I_{ESD}$ flows from the nMOS transistor source electrode 284 to the nMOS transistor drain electrode 286, thus discharging the voltage spike 48 associated with the ESD event.

Those skilled in the art will recognize improvements and modifications to the embodiments of the present disclosure. All such improvements and modifications are considered within the scope of the concepts disclosed herein and the claims that follow.

What is claimed is:

1. An electrostatic discharge (ESD) protection circuit in an integrated circuit (IC) comprising:
    ESD clamping circuitry coupled between a supply rail and a ground rail and configured to discharge an ESD event in an IC in response to an activation signal;
    trigger circuitry configured to divide a voltage spike between the supply rail and the ground rail to provide a trigger voltage; and
    latch circuitry coupled to the ESD clamping circuitry and the trigger circuitry and configured to:
        detect that the trigger voltage exceeds an ESD threshold voltage; and
        provide the activation signal to the ESD clamping circuitry to discharge the ESD event in response to detecting the trigger voltage exceeding the ESD threshold voltage;
    wherein the trigger circuitry is decoupled from the latch circuitry when the latch circuitry provides the activation signal to the ESD clamping circuitry to discharge the ESD event in the IC.

2. The ESD protection circuit of claim 1 wherein the trigger circuitry comprises a voltage divider configured to provide the trigger voltage between an output point of the voltage divider and the ground rail.

3. The ESD protection circuit of claim 2 further comprising a diode having an anode and a cathode, wherein:
    the anode is coupled to the output point of the voltage divider;
    the cathode is coupled to the latch circuitry; and
    the diode is reverse-biased to decouple the trigger circuitry from the latch circuitry when the latch circuitry provides the activation signal to the ESD clamping circuitry.

4. The ESD protection circuit of claim 1 wherein the trigger circuitry comprises a resistor divider configured to provide the trigger voltage between an output point of the resistor divider and the ground rail, the resistor divider comprising:
    a first resistor disposed between the supply rail and the output point of the resistor divider; and
    a second resistor disposed between the output point of the resistor divider and the ground rail.

5. The ESD protection circuit of claim 4 further comprising a diode having an anode and a cathode, wherein:
the anode is coupled to the output point of the resistor divider;
the cathode is coupled to the latch circuitry; and
the diode is reverse-biased to decouple the trigger circuitry from the latch circuitry when the latch circuitry provides the activation signal to the ESD clamping circuitry.

6. The ESD protection circuit of claim 4 wherein the trigger circuitry further comprises a leakage reduction transistor disposed between the supply rail and the first resistor and configured to reduce leakage current flowing through the resistor divider when the trigger voltage is less than the ESD threshold voltage.

7. The ESD protection circuit of claim 6 wherein the leakage reduction transistor is a p-type metal-oxide semiconductor (pMOS) transistor.

8. The ESD protection circuit of claim 4 wherein the trigger circuitry further comprises a variation-offset transistor disposed in parallel to the second resistor in the resistor divider and configured to offset ESD threshold voltage variations in the latch circuitry.

9. The ESD protection circuit of claim 8 wherein the variation-offset transistor is an n-type metal-oxide semiconductor (nMOS) transistor.

10. The ESD protection circuit of claim 1 wherein the trigger circuitry comprises:
a resistor divider comprising a first resistor and a second resistor and configured to provide the trigger voltage between an output point of the resistor divider and the ground rail;
a leakage reduction transistor configured to reduce leakage current flowing through the resistor divider when the trigger voltage is less than the ESD threshold voltage; and
a variation-offset transistor configured to offset ESD threshold voltage variations in the latch circuitry;
wherein:
the leakage reduction transistor is disposed between the supply rail and the first resistor;
the first resistor is coupled to the output point;
the second resistor is disposed between the output point and the ground rail; and
the variation-offset transistor is disposed in parallel to the second resistor disposed between the output point and the ground rail.

11. The ESD protection circuit of claim 1 wherein the trigger circuitry comprises a p-type-n-type (P-N) transistor divider configured to provide the trigger voltage between an output point of the P-N transistor divider and the ground rail, the P-N transistor divider comprising:
a first P-N transistor disposed between the supply rail and the output point of the P-N transistor divider; and
a second P-N transistor disposed between the output point of the P-N transistor divider and the ground rail.

12. The ESD protection circuit of claim 11 further comprising a diode having an anode and a cathode, wherein:
the anode is coupled to the output point of the P-N transistor divider;
the cathode is coupled to the latch circuitry; and
the diode is reverse-biased to decouple the trigger circuitry from the latch circuitry when the latch circuitry provides the activation signal to the ESD clamping circuitry.

13. The ESD protection circuit of claim 11 wherein the first P-N transistor is a p-type metal-oxide semiconductor (pMOS) transistor and the second P-N transistor is an n-type metal-oxide semiconductor (nMOS) transistor.

14. The ESD protection circuit of claim 1 wherein the trigger circuitry comprises a p-type-p-type (P-P) transistor divider configured to provide the trigger voltage between an output point of the P-P transistor divider and the ground rail, the P-P transistor divider comprising:
a first P-P transistor disposed between the supply rail and the output point of the P-P transistor divider; and
a second P-P transistor disposed between the output point of the P-P transistor divider and the ground rail.

15. The ESD protection circuit of claim 14 further comprising a diode having an anode and a cathode, wherein:
the anode is coupled to the output point of the P-P transistor divider;
the cathode is coupled to the latch circuitry; and
the diode is reverse-biased to decouple the trigger circuitry from the latch circuitry when the latch circuitry provides the activation signal to the ESD clamping circuitry.

16. The ESD protection circuit of claim 14 wherein the first P-P transistor and the second P-P transistor are p-type metal-oxide semiconductor (pMOS) transistors.

17. The ESD protection circuit of claim 1 wherein the trigger circuitry comprises a hybrid voltage divider configured to provide the trigger voltage between an output point of the hybrid voltage divider and the ground rail, the hybrid voltage divider comprising:
a resistor coupled to the output point;
a p-type metal-oxide semiconductor (pMOS) transistor coupled between the supply rail and the resistor;
a diode having an anode and a cathode, wherein the anode is coupled to the output point;
a loopback resistor coupled to the cathode of the diode; and
a clamping circuitry resistor coupled to the loopback resistor and the ground rail.

18. The ESD protection circuit of claim 1 further comprising delay circuitry coupled between the supply rail and the ground rail, the delay circuitry having a resistor and a capacitor disposed in a serial arrangement, wherein:
the resistor is disposed between the supply rail and a coupling point;
the capacitor is disposed between the coupling point and the ground rail; and
the coupling point is configured to provide a delay circuitry output signal.

19. The ESD protection circuit of claim 18, wherein the latch circuitry comprises:
a negative-AND (NAND) gate comprising a first gate input terminal, a second gate input terminal, and a gate output terminal, the second gate input terminal coupled to the trigger circuitry;
a first inverter having a first inverter input terminal and a first inverter output terminal, the first inverter input terminal coupled to the coupling point and the first inverter output terminal coupled to the first gate input terminal; and
a second inverter having a second inverter input terminal and a second inverter output terminal, the second inverter input terminal coupled to the gate output terminal and the second inverter output terminal coupled to the ESD clamping circuitry.

* * * * *